(12) United States Patent
Koyanagi et al.

(10) Patent No.: US 6,242,870 B1
(45) Date of Patent: *Jun. 5, 2001

(54) LIGHT EMITTING DEVICE DRIVING CIRCUIT

(75) Inventors: Hisako Koyanagi; Hiroyuki Rokugawa, both of Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,957

(22) Filed: Mar. 13, 1998

(30) Foreign Application Priority Data

Oct. 16, 1997 (JP) .................................. 9-283549

(51) Int. Cl.$^7$ ........................................ G05F 1/00
(52) U.S. Cl. .................. 315/291; 315/309; 315/149; 315/158; 362/800
(58) Field of Search ................... 359/183; 372/82, 372/26, 38, 34, 35; 315/158, 360, 117, 112, 118, 309, 291; 307/157, 117, 10.8; 340/584, 643

(56) References Cited

U.S. PATENT DOCUMENTS

| | | | |
|---|---|---|---|
| 3,705,316 | * 12/1972 | Burrous et al. | 307/311 |
| 3,899,732 | * 8/1975 | Staby | 324/29.5 |
| 4,243,952 | * 1/1981 | Patterson | 331/94.5 |
| 4,339,822 | * 7/1982 | Kolodzey | 372/26 |
| 4,687,956 | * 8/1987 | Itoh et al. | 307/310 |
| 4,710,622 | * 12/1987 | Imamura | 250/214 |
| 5,254,975 | * 10/1993 | Torikoshi | 340/589 |
| 5,260,955 | * 11/1993 | Davis et al. | 372/31 |
| 5,761,230 | * 6/1998 | Oono et al. | 372/38 |
| 5,907,569 | * 5/1999 | Glance et al. | 372/38 |
| 6,031,855 | * 2/2000 | Watanabe | 372/38 |

FOREIGN PATENT DOCUMENTS 60-254783 12/1985 (JP).

* cited by examiner

Primary Examiner—Don Wong
Assistant Examiner—Tuyet T. Vo
(74) Attorney, Agent, or Firm—Staas & Halsey LLP

(57) ABSTRACT

A light emitting device driving circuit capable of, at all times, securing a constant optical output by a simple configuration even in a case of driving a light emitting device having characteristics changing according to temperature fluctuations, provided with a driving transistor for feeding a bias current and a pulse current to a light emitting device having a grounded-cathode, an adjusting resistor for adjusting the pulse current and bias current fed to the light emitting device, and a resistive dividing circuit comprising series-connected dividing resistors for individually setting the pulse current and bias current, the series-connected dividing resistors being constituted by a temperature dependent resistive unit.

28 Claims, 15 Drawing Sheets

US 6,242,870 B1

LIGHT EMITTING DEVICE DRIVING CIRCUIT

BACKGROUND OF THE INVENTION

1. Field of the Invention

The present invention relate to a light emitting device driving circuit.

In recent years, along with the advances made in optical communications and the advances made in an optical disc device etc., use of light emitting devices has rapidly spread. Looking at the optical communications, for example, an optical repeater is one of the important devices for realizing optical communications. In this optical repeater, a semiconductor laser or other light emitting device is used. This plays the role of converting an input electrical signal to an optical signal.

The light emitting device driving circuit according to the present invention is a driving circuit particularly preferred for driving a light emitting device comprised of a semiconductor laser (laser diode).

2. Description of the Related Art

As will be explained in detail later by using the drawings, when a light emitting device having a threshold current (Ith) or a differential quantum efficiency ($\eta$) which fluctuates according to the temperature is used as the above light emitting device, in the light emitting device driving circuit of the related art, the optical output power (Pout) fluctuates according to the fluctuation of the temperature. For this reason, when such a light emitting device is used in the light emitting device driving circuit of the related art, of course, there is a problem that the range of the operating temperature is limited, so application to a circuit where optimum operation is required in a wide range of temperature is difficult. Conversely, when it is desired to apply the light emitting device driving circuit of the related art to a circuit where optimum operation is required in a wide range of temperature, there arises a problem in that the selection of the light emitting device becomes difficult.

SUMMARY OF THE INVENTION

Accordingly, an object of the present invention is to provide a light emitting device driving circuit capable of, at all times, feeding a constant optical output power Pout over a wide range of temperature even in a case of driving a light emitting device having a threshold current (Ith) and a differential quantum efficiency ($\eta$) which fluctuate according to temperature fluctuations.

To attain the above object, the light emitting device driving circuit of the present invention is provided with a driving transistor for feeding a bias current and a pulse current to a light emitting device having a grounded-cathode, an adjusting resistor for adjusting the pulse current and bias current fed to the light emitting device, and a resistive dividing circuit comprising series-connected dividing resistors for individually setting the pulse current and bias current, wherein the series-connected dividing resistors are constituted by a temperature dependent resistive unit.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 16:
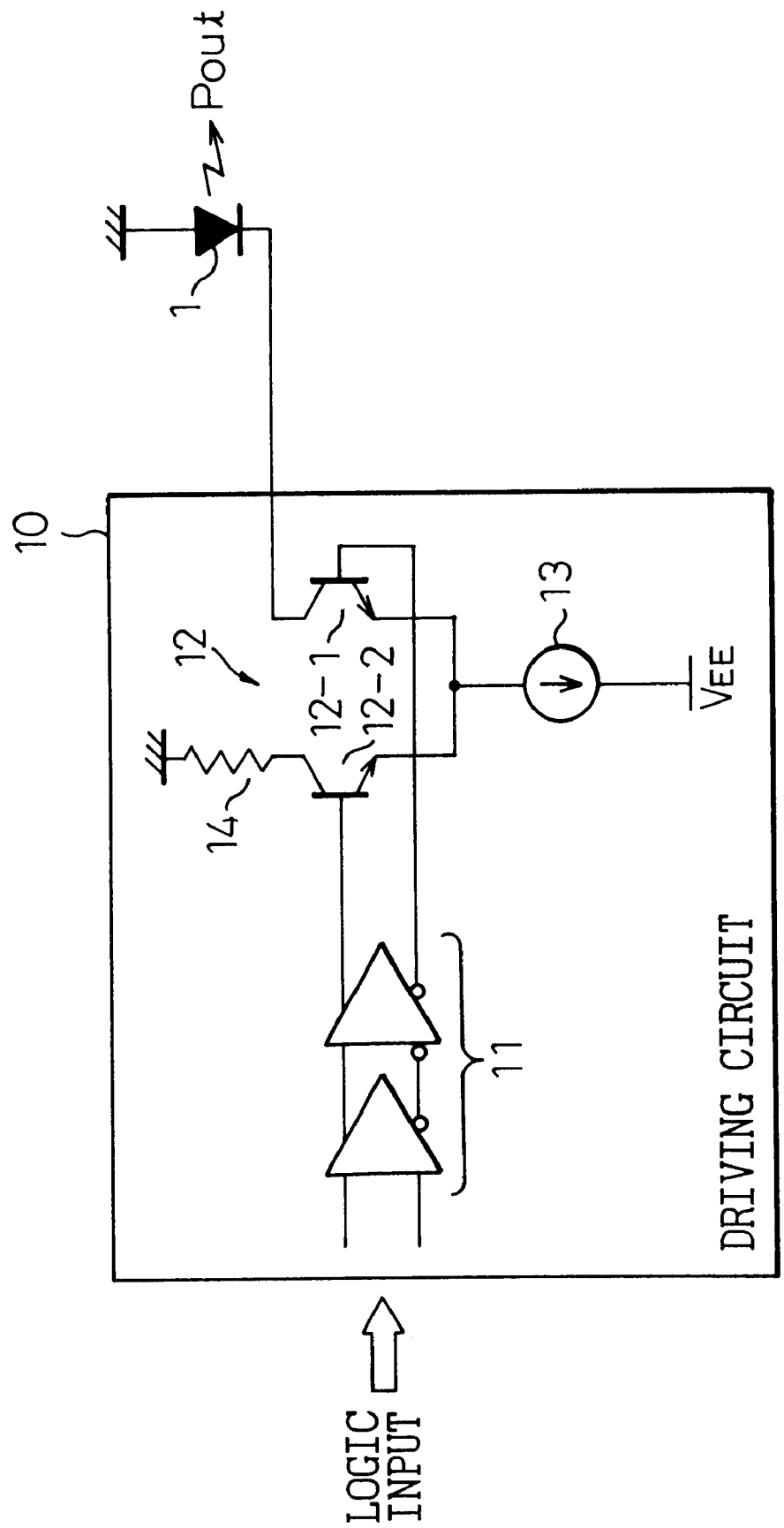
FIG. 16 is a view of an example of a general circuit configuration of the light emitting device driving circuit.

FIG. 16 is a view of an example of a general circuit configuration of a light emitting device driving circuit. In the figure, 1 is a light emitting device, and 10 is a driving circuit for driving this light emitting device 1.

The driving circuit 10 shown in the figure comprises for example a two-stage structured buffer 11 receiving a logic input ("1", "0"), a differential transistor pair 12 which complimentarily turns on or off according to the differential output of the buffer 11, and a constant current source 13 coupled to commonly connected emitters of this differential transistor pair 12. A cathode of the light emitting device 1 is connected to one transistor 12-1 of the differential transistor pair 12, and a load resistor 14 is connected to the other transistor 12-2.

The buffer 11 receiving the logic input functions to increase the magnitude of the logic input signal and to stabilize the magnitude of the signal and complimentarily turns the transistors 12-1 and 12-2 on or off by the output of the buffer in accordance with the "1" or "0" of the logic input signal. By this, the light emitting device 1 turns the light on or off to generate the optical output power Pout.

The above configuration is preferred when used in a trunk line (optical transmission among offices) of an optical communication network. Note, that the circuit configuration is not simple. On the other hand, looking at a subscriber side of the optical communication network and an optical signal apparatus in an office, a large amount of this type of light emitting device driving circuit is used. Accordingly, it is required that the circuit configuration be extremely simple. In this case, since the distance of the fibers for the optical signal transmission used at the subscriber side and optical signal apparatus is short, for example, less than several kilometers, the light emitting device driving circuit can be relatively simply constituted taking into account the fact that the transmission loss of the light is small.

In view of this situation, a light emitting device driving circuit having a simple circuit configuration was proposed. Below, an explanation will be made of three types of aspects by using the drawings.

Figure 17:
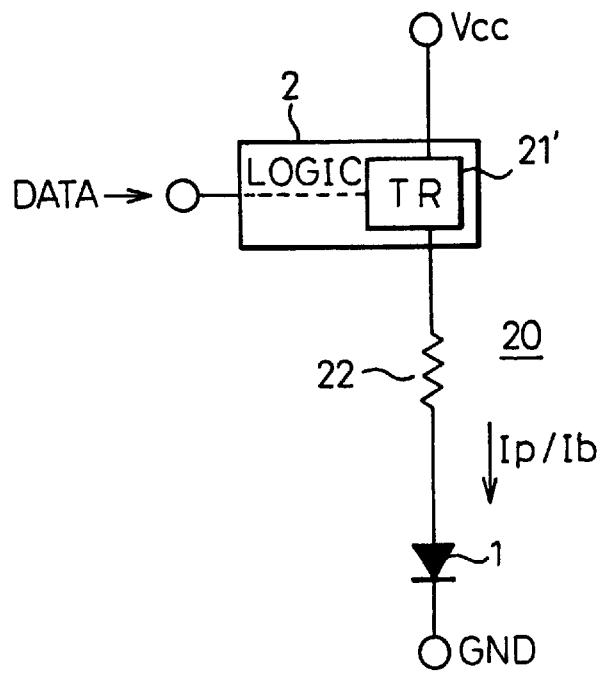
FIG. 17 is a view of a first aspect of the light emitting device driving circuit of the related art.
Figure 18:
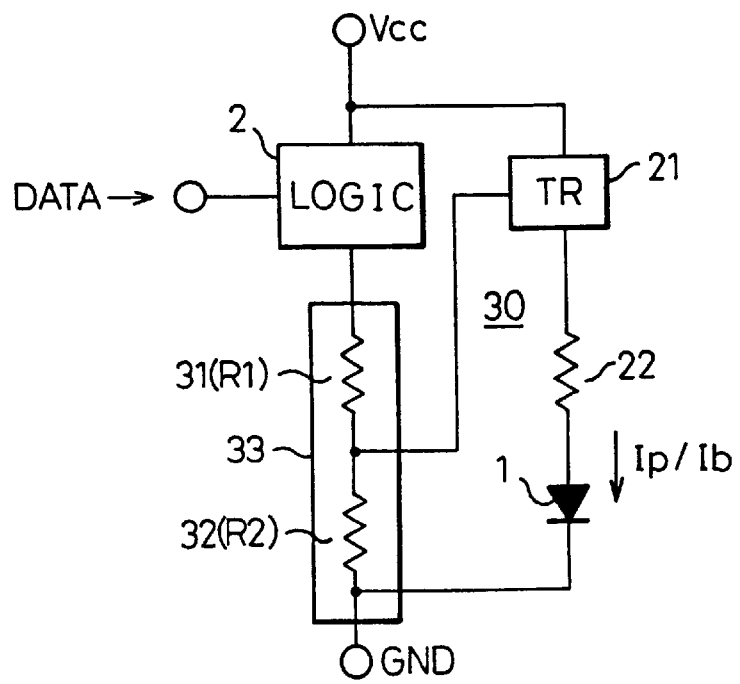
FIG. 18 is a view of a second aspect of the light emitting device driving circuit of the related art.
Figure 19:
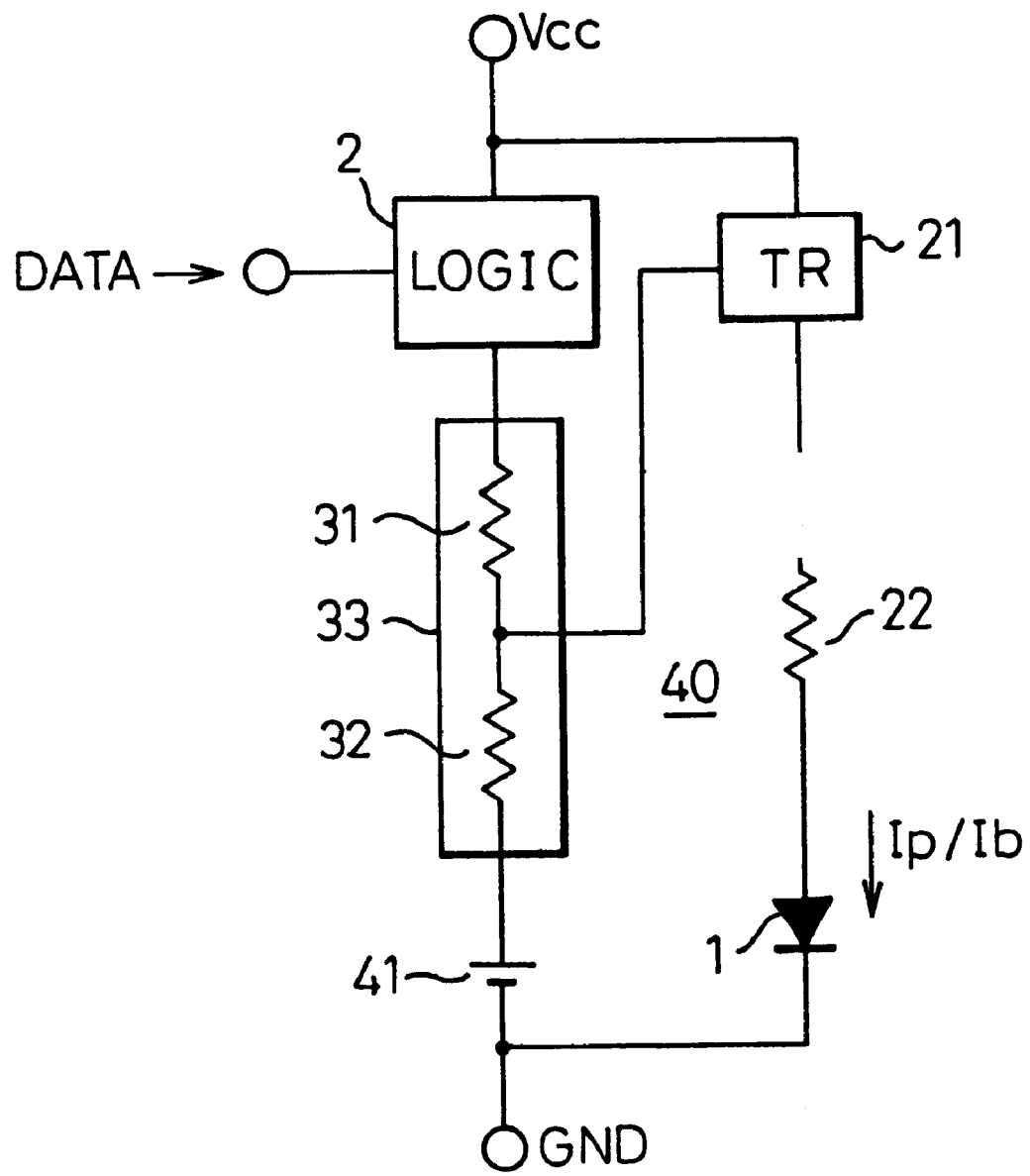
FIG. 19 is a view of a third aspect of the light emitting device driving circuit of the related art.

FIG. 17 is a view of a first aspect of the light emitting device driving circuit of the related art; FIG. 18 is a view of a second aspect of the light emitting device driving circuit of the related art; and FIG. 19 is a view of a third aspect of the light emitting device driving circuit of the related art. Note that similar constituent elements are shown by the same reference numerals or symbols throughout the drawings.

A light emitting device driving circuit 20 of the first aspect shown in FIG. 17 is connected between an anode side of a light emitting device 1 having a grounded-cathode and a power source (Vcc) side. It is configured provided with a driving transistor 21' for feeding, to this light emitting device 1, a bias current Ib and a pulse current Ip responding to an input pulse and an adjusting resistor 22 for adjusting the pulse current Ip and the bias current Ib fed to this light emitting device 1. Note that the input pulse is produced in accordance with a logic input data (DATA) from a final output stage transistor of the logic circuit 2. The driving transistor (TR) 21' of the figure and the final output stage transistor are commonly realized, as a single transistor, in the logic circuit 2.

A light emitting device driving circuit 30 of the second aspect shown in FIG. 18 is configured provided with a driving transistor (TR) 21 for feeding, both the bias current Ib and the pulse current Ip responding to an input pulse to an anode side of the light emitting device 1 having a grounded-cathode, the adjusting resistor 22 for adjusting the pulse current Ip and the bias current Ib fed to this light emitting device 1, and a resistive dividing circuit 33 comprising series-connected dividing resistors 31 and 32 for individually setting the pulse current Ip and the bias current Ib fed to the light emitting device 1.

A light emitting device driving circuit 40 of the third aspect shown in FIG. 19 is obtained by adding a constant voltage source 41 to the light emitting device driving circuit according to the second aspect.

The light emitting device driving circuits (20, 30, 40) of the related art explained above have extremely simple circuit configurations. Although the configurations are simple, the cathode side of the light emitting device 1 is grounded to a wide ground GND, and a current flows into GND from its anode side, so it is not necessary to take measures for suppressing fluctuations of the power source (Vcc).

Analysis of these light emitting device driving circuits (20, 30, 40) shows the following:

In the circuit of FIG. 17, when the power source voltage is Vcc, the high level of the output of the logic circuit 2 is Vout (H), the low level of the output thereof is Vout (L), the built-in voltage of the light emitting device 1 is $\Phi_{LD}$, and the resistance value for setting the value of the current flowing through the light emitting device 1 is $R_{LD}$, the pulse current Ip and the bias current Ib are represented by the following equations:

$$Ib=(Vcc-Vout(L)-\Phi_{LD})/R_{LD} \quad (1)$$

$$Ip=(Vcc-Vout(H)-\Phi_{LD})/R_{LD}-Ib \quad (2)$$

For example, if Vcc=5.0V and the required Ib=30 mA, the low level of the output of the P (positive)-ECL logic circuit 2 is about 3.3V, therefore $R_{LD}$=75Ω can be derived. By this, the pulse current Ip becomes 11 mA.

Since the magnitude of the output of the logic circuit 2 is usually 0.8 to 1.0V, if either one of the pulse current and bias current is determined, the other is uniquely determined. Further, from Equations (1) and (2), the pulse current Ip is represented by:

$$Ip=(Vout(H)-Vout(L))/R_{LD} \quad (3)$$

Next, in the circuit of FIG. 18, if a dividing ratio of the resistive dividing circuit 33 (R2/(R1+R2)) is defined as n, the pulse current Ip is represented as:

$$Ip=n\times(Vout(H)-Vout(L))/R_{LD} \quad (4)$$

therefore by correcting the output magnitude (Vout(H)−Vout(L)) of the logic circuit 2 by the resistive dividing circuit 33, it becomes possible to individually set the pulse current Ip and the bias current Ib.

At this time, due to the introduction of the dividing resistors, the DC voltage applied to the driving transistor 21 is lowered, so the value of the obtainable bias current Ib is limited. For this reason, as shown in FIG. 19, the constant voltage source 41 is added to the low level power source GND side. By this, it is possible to prevent the DC voltage of the input applied to the driving transistor 12 from being lowered too much and the obtainable bias current Ib becomes large.

The threshold current Ith of the general light emitting device at a certain temperature Tc (° C.) is represented as in the following equation. It has been known that Ith fluctuates according to a fluctuation in temperature.

$$Ith(Tc)=Ith(25° C.)\times exp((Tc-25° C.)/T_o) \quad (5)$$

Here, Ith (25° C.) is the threshold current at 25° C., and $T_o$ is the value peculiar to each light emitting device. In the circuits shown in FIGS. 17, 18, and 19, the value of the bias current Ib is constant without depending on the temperature, as shown in Equation (1).

On the other hand, if the differential quantum efficiency is defined as η(mW/mA), the optical output power Pout of the light emitting device is represented by:

$$Pout=(Ip+Ib-Ith(Tc))\times\eta \quad (6)$$

so if the threshold current of the light emitting device fluctuates due to a fluctuation in temperature, the optical output power Pout also fluctuates. Namely, when a light emitting device 1 having a differential quantum efficiency η is used, which efficiency η fluctuates according to the temperature, fluctuation will occur in the optical output power Pout according to the above Equation (6).

As already explained, when a light emitting device 1 with a threshold current Ith or a differential quantum efficiency η which fluctuates according to the temperature is used as the above light emitting device, in the light emitting device driving circuit of the related art, the optical output power Pout fluctuates along with a fluctuation of the temperature. For this reason, when such a light emitting device is used in the light emitting device driving circuit of the related art, of course, there is a problem that the range of the operating temperature is limited, so application to a circuit which requires an optimum operation in a wide temperature range is difficult. Conversely, when it is desired to apply the light emitting device driving circuit of the related art to a circuit which requires optimum operation in a wide temperature range, there arises a problem in that the selection of the light emitting device becomes difficult.

Accordingly, the present invention provides a light emitting device driving circuit capable of, at all times, feeding a constant optical output power Pout over a wide temperature range even in a case where a light emitting device with a threshold current Ith and a differential quantum efficiency η which fluctuate according to a fluctuation in temperature is driven. This will be explained in detail below.

Figure 1:
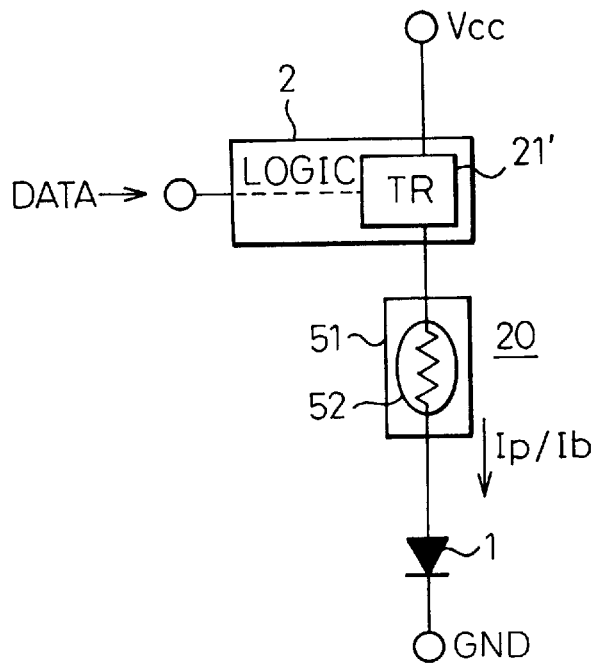
FIG. 1 is a view of a first aspect of a light emitting device driving circuit according to the present invention.

FIG. 1 is a view of a first aspect of the light emitting device driving circuit according to the present invention. The configuration of the figure is characterized in that the adjusting resistor 22 is constituted by a temperature dependent resistive unit 51. As a concrete example of this resistive unit 51, in the figure, a thermistor 52 is shown.

In FIG. 1, by using the thermistor 52 in place of the adjusting resistor 22 of the related art, the resistance value $R_{LD}$ in the above Equation (1) fluctuates according to the temperature and it becomes possible to follow the fluctuation of the threshold current of the light emitting device 1. Further, from the above Equation (2), the value of the pulse current Ip fluctuates along with a fluctuation in temperature, so it becomes possible for the pulse current Ip to follow the change of the differential quantum efficiency η.

Figure 2:
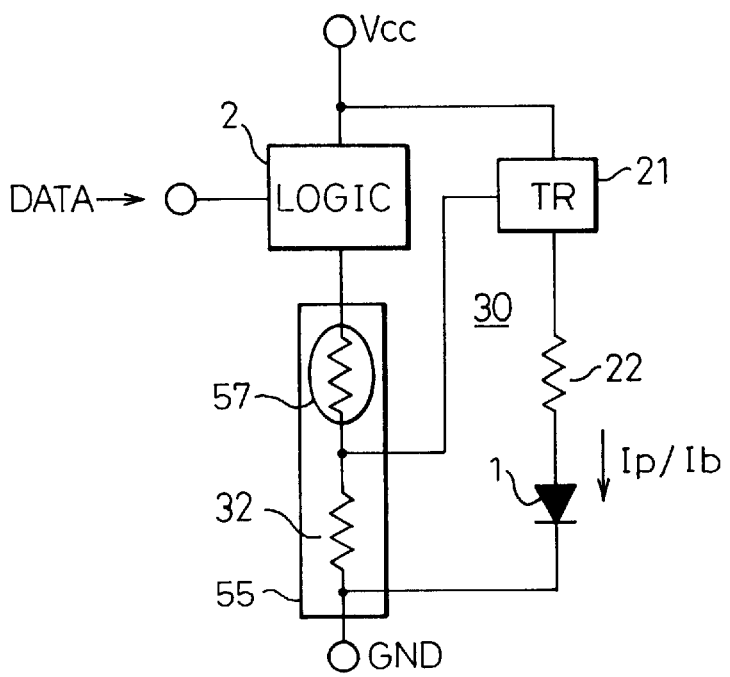
FIG. 2 is a view of a second aspect of the light emitting device driving circuit according to the present invention.

FIG. 2 is a view of a second aspect of the light emitting device driving circuit according to the present invention. The configuration of the figure is characterized in that the series-connected dividing resistors 31 and 32 are constituted by a temperature dependent resistive unit 55. As a concrete example of this resistive unit 55, in the figure, a configuration is shown comprising a series-connected first dividing resistor 57 and second dividing resistor 32, where the first dividing resistor 57 is constituted a thermistor.

Figure 3:
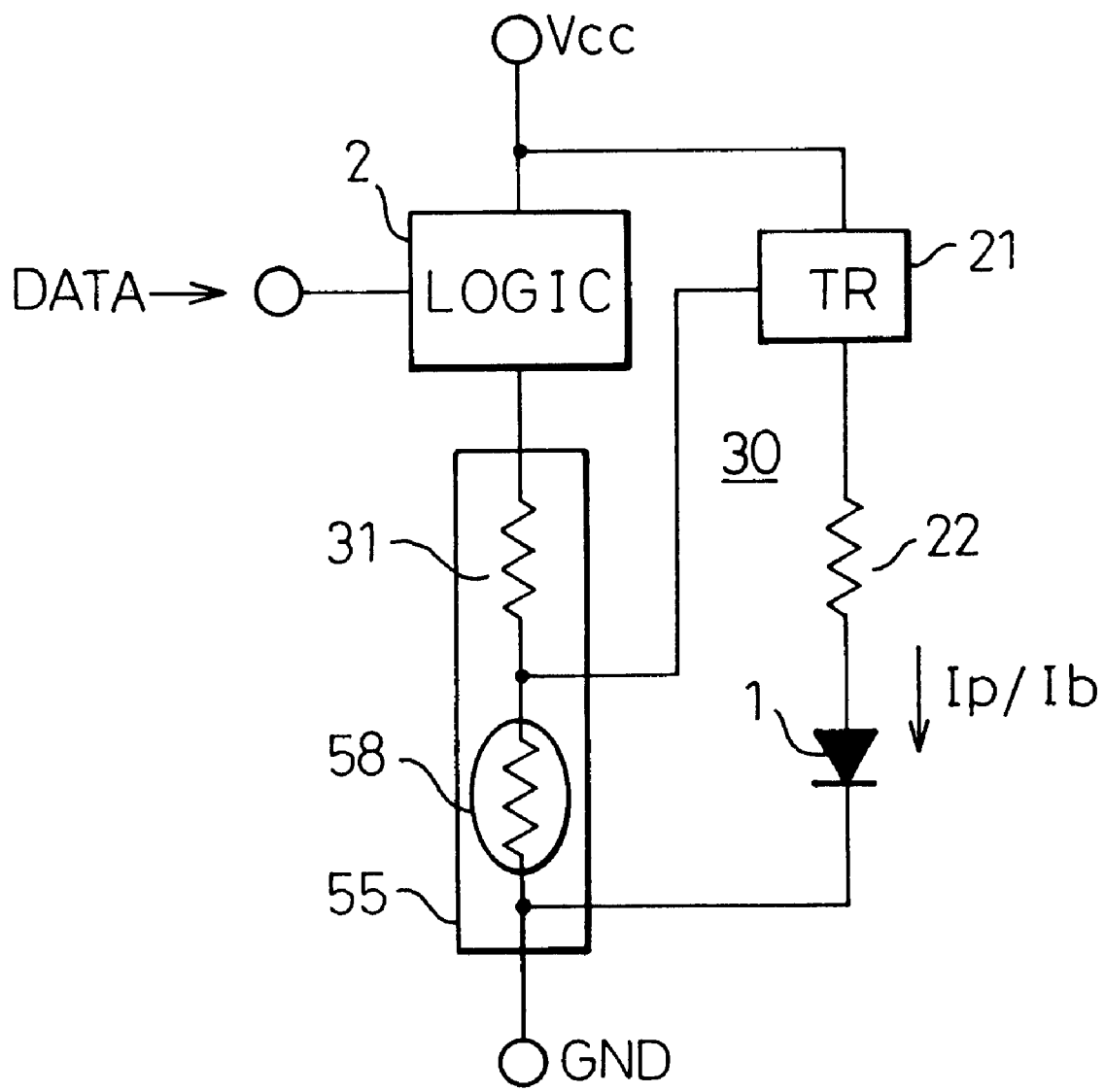
FIG. 3 is a view of a modification of the configuration of FIG. 2.

FIG. 3 is a view of a modification of the configuration of FIG. 2. According to the configuration of the figure, the temperature dependent resistive unit 55 comprises a series-connected first dividing resistor 31 and second dividing resistor 58, where the second dividing resistor 58 is constituted by a positive characteristic thermistor. The positive characteristic thermistor is a so-called posistor and has an inverse resistance-temperature characteristics to that of the thermistor.

According to the configurations of FIG. 2 and FIG. 3, by making one of the resistors constituting the resistive dividing circuit 33 of the related art the thermistor 57 or posistor 58, the DC level applied to an input of the dividing resistor 21 is changed in accordance with a fluctuation in temperature, whereby the threshold current Ith of the light emitting device 1 can be made to follow a temperature fluctuation.

At this time, the dividing ratio n of the resistive dividing circuit 55 changes, therefore, from the above Equation (4), it becomes possible for the pulse current Ip to also follow a change of the differential quantum efficiency η.

Figure 4:
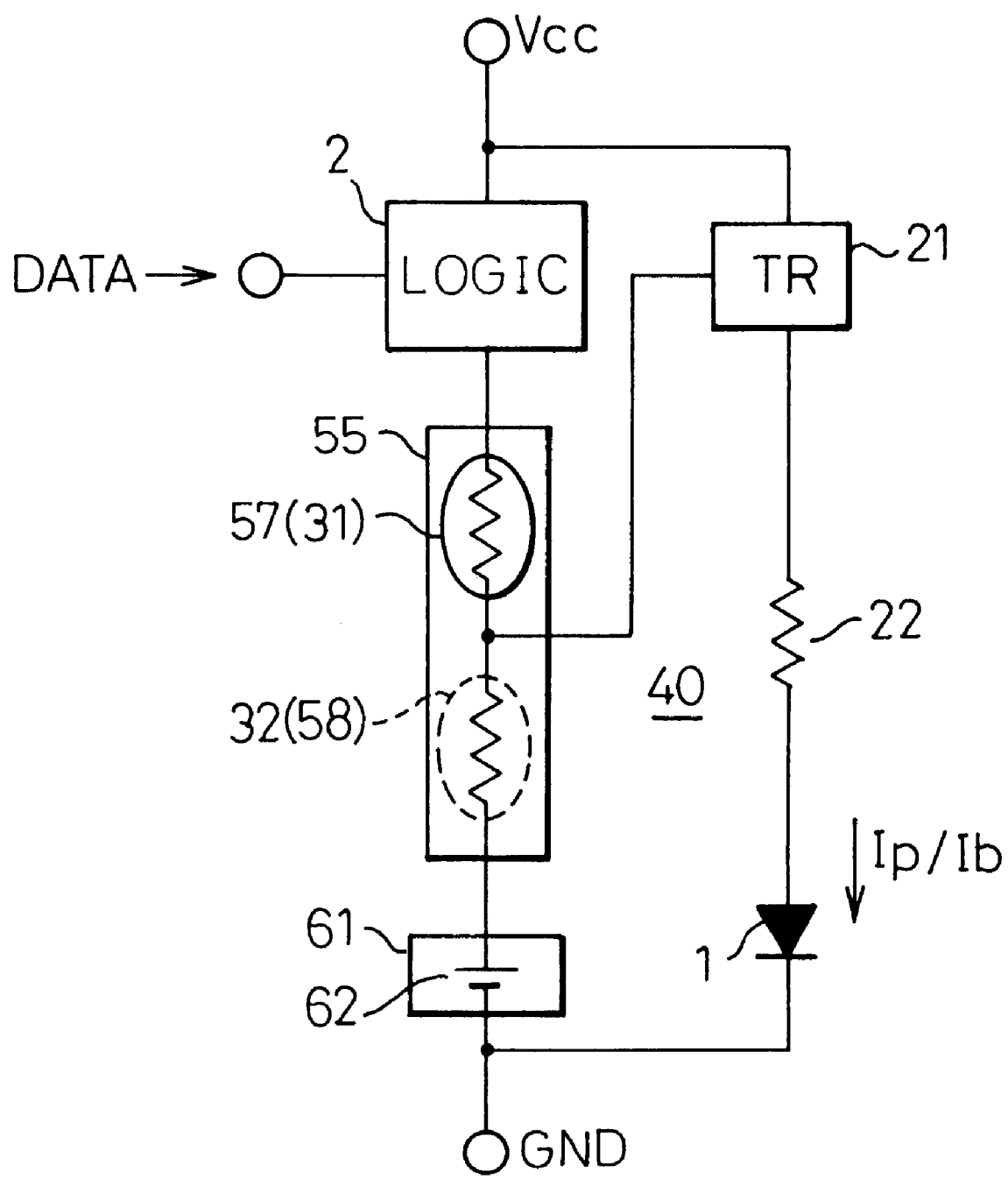
FIG. 4 is a view of a third aspect of the light emitting device driving circuit according to the present invention.

FIG. 4 is a view of a third aspect of the light emitting device driving circuit according to the present invention.

The configuration of the figure is obtained by adding, to the circuit of FIG. 2, a boosting unit 61 for boosting a resistive dividing voltage from the resistive dividing circuit acting as the temperature dependent resistive unit 55. As a concrete example of this boosting unit 61, in the figure, a configuration comprising a constant voltage source 62 is shown.

As the temperature dependent resistive unit 55 in this case, a configuration as in FIG. 2 (57 and 32) or a configuration as in FIG. 3 (31 and 58) can be adopted.

By adding the boosting unit 61, a large bias current Ib can be produced.

Figure 5:
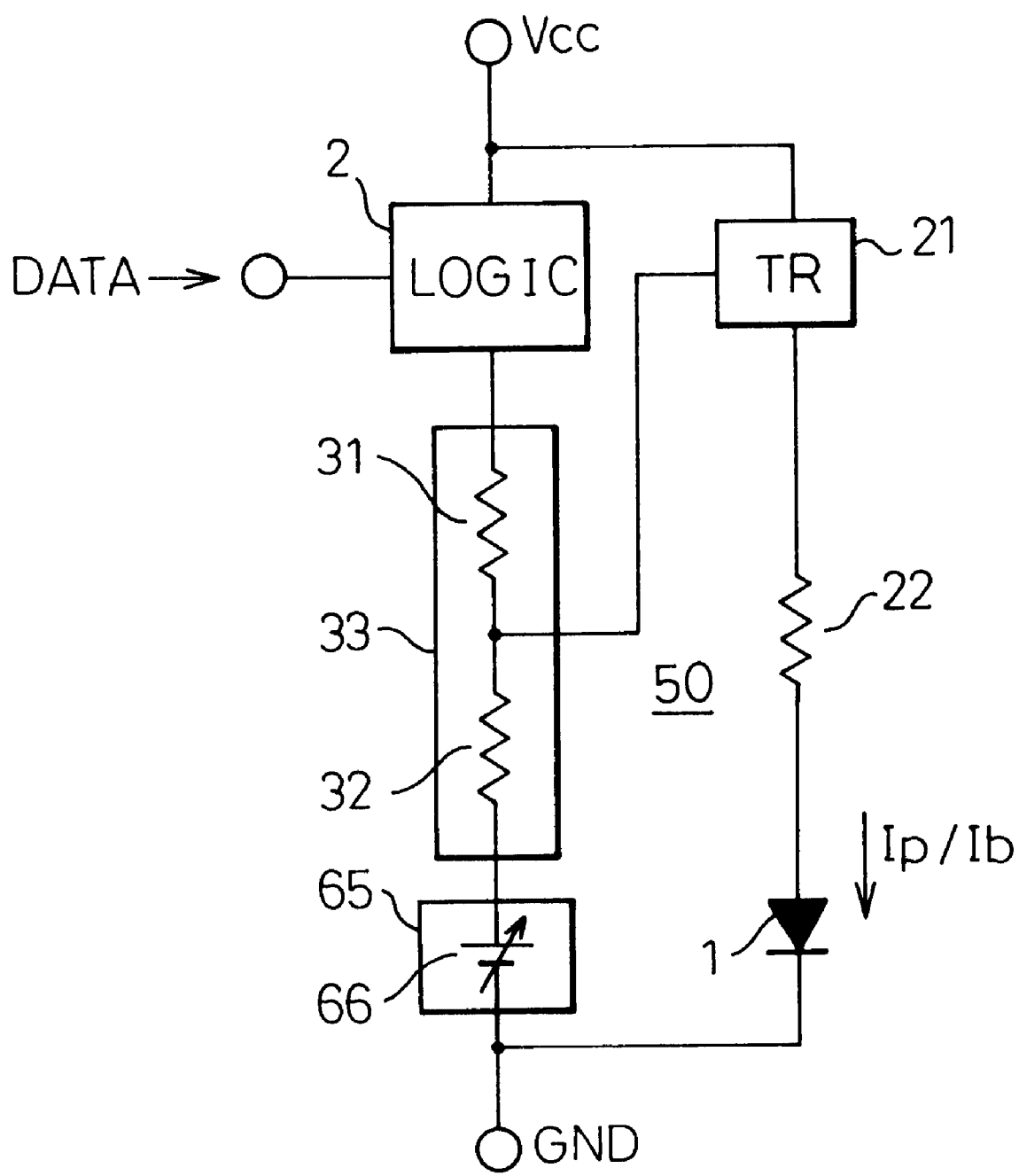
FIG. 5 is a view of a fourth aspect of the light emitting device driving circuit according to the present invention.

FIG. 5 is a view of a fourth aspect of the light emitting device driving circuit according to the present invention. The light emitting device driving circuit 50 of the figure is characterized in that a temperature dependent boosting unit 65 for boosting the resistive dividing voltage from the resistive dividing circuit 33 depending upon the temperature, is provided to the resistive dividing circuit 33. As a concrete example of this temperature dependent boosting unit 65, in the figure, a configuration comprising a temperature dependent voltage source 66 is shown.

In FIG. 5, by configuring the resistive dividing circuit 33 as in the related art and imparting the temperature characteristic to only the boosting unit 65, only the bias current Ib can be changed with respect to the temperature without changing the pulse current Ip. Accordingly, for example, where it is not intended to change the pulse current Ip due to the temperature as in the case of driving a light emitting device 1 having a differential quantum efficiency which does not fluctuate according to temperature, the present configuration is preferably used.

Figure 6:
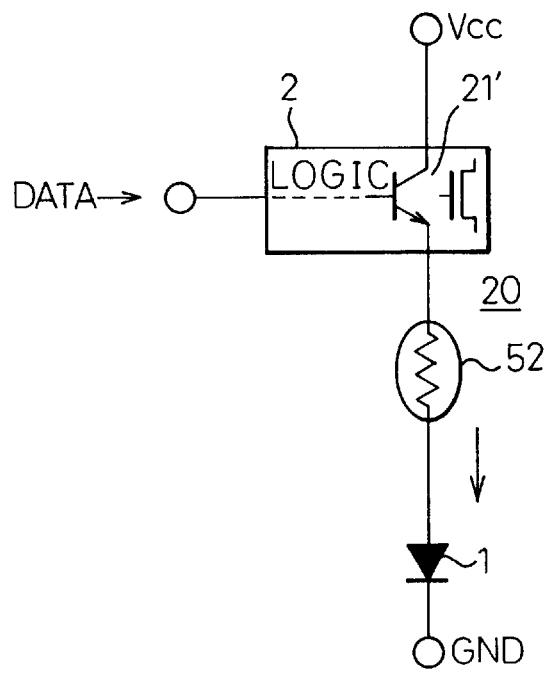
FIG. 6 is a view of a first embodiment of the present invention.

FIG. 6 is a view of a first embodiment of the present invention. The driving transistor 21' is constituted by a bipolar transistor or a field effect transistor.

Figure 7:
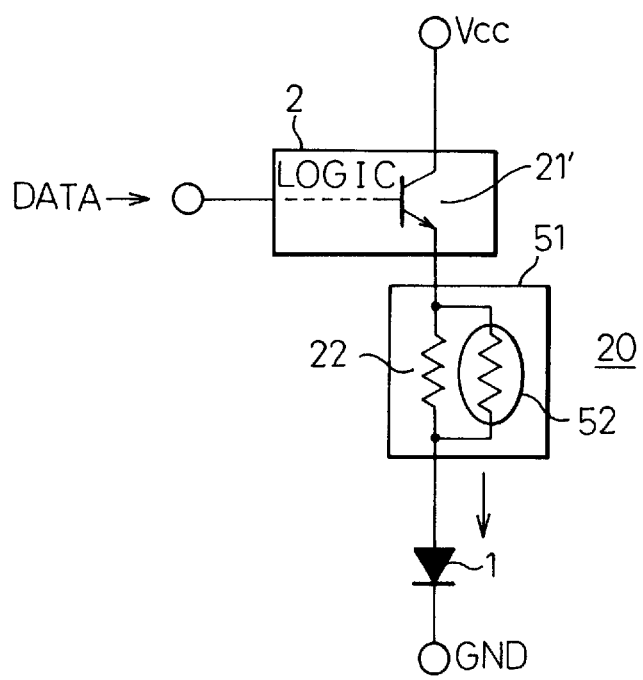
FIG. 7 is a view of a second embodiment of the present invention.

FIG. 7 is a view of a second embodiment of the present invention. The temperature dependent resistive unit 51 is constituted by the adjusting resistor 22 and the thermistor 52 connected to this adjusting resistor 22 in parallel.

When the desired resistance-temperature characteristics cannot be obtained by only the thermistor 52, by connecting a resistor and a thermistor in parallel and appropriately selecting the resistor, the desired resistance-temperature characteristics can be obtained. The same applies to the posistor.

Figure 8:
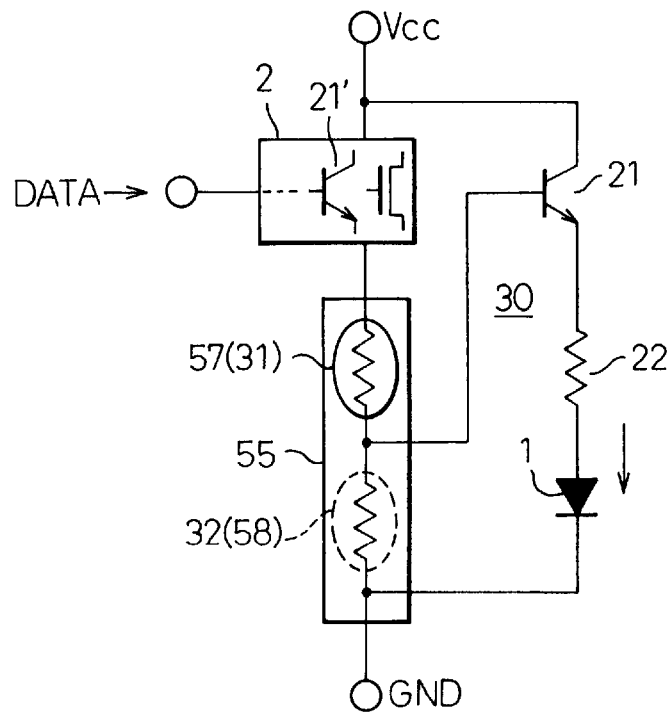
FIG. 8 is a view of a third embodiment of the present invention.

FIG. 8 is a view of a third embodiment of the present invention. The source of the input pulse is the final output stage transistor of the logic circuit 2. This transistor is a bipolar transistor or field effect transistor. Further, the driving transistor 21 is constituted by a bipolar transistor.

As the temperature dependent resistive unit 55 in this case, the configuration shown in FIG. 2 (57 and 32) or the configuration shown in FIG. 3 (31 and 58) can be adopted.

Figure 9:
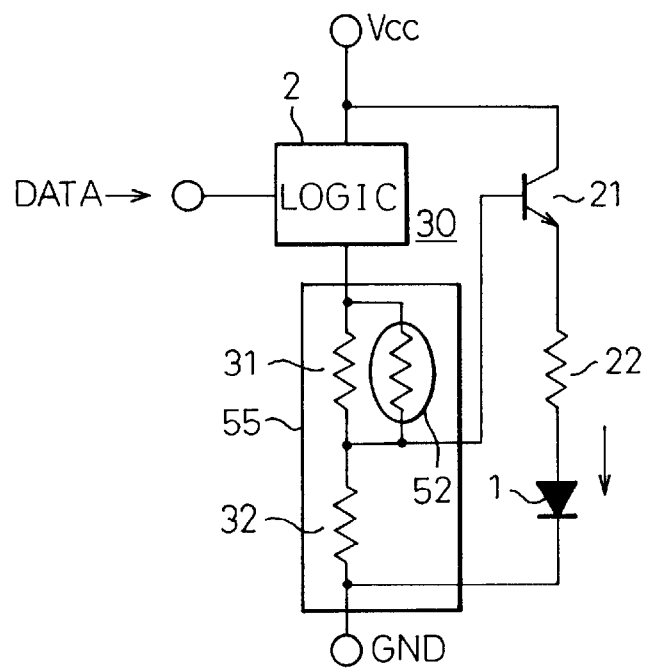
FIG. 9 is a view of a fourth embodiment of the present invention.

FIG. 9 is a view of a fourth embodiment of the present invention. In the figure, the temperature dependent resistive unit 11 is constituted by a first dividing resistor 31 and second dividing resistor 32 forming series-connected dividing resistors and a thermistor 52 connected to this first dividing resistor 31 in parallel.

In the same way as the case of FIG. 7, when the desired resistance-temperature characteristics cannot be obtained by just the thermistor 52, by connecting the resistor and thermistor in parallel and appropriately selecting the resistor, the desired resistance-temperature characteristics can be obtained. The same applies to a posistor.

Further, the driving transistor 21 is constituted by the bipolar transistor.

Figure 10:
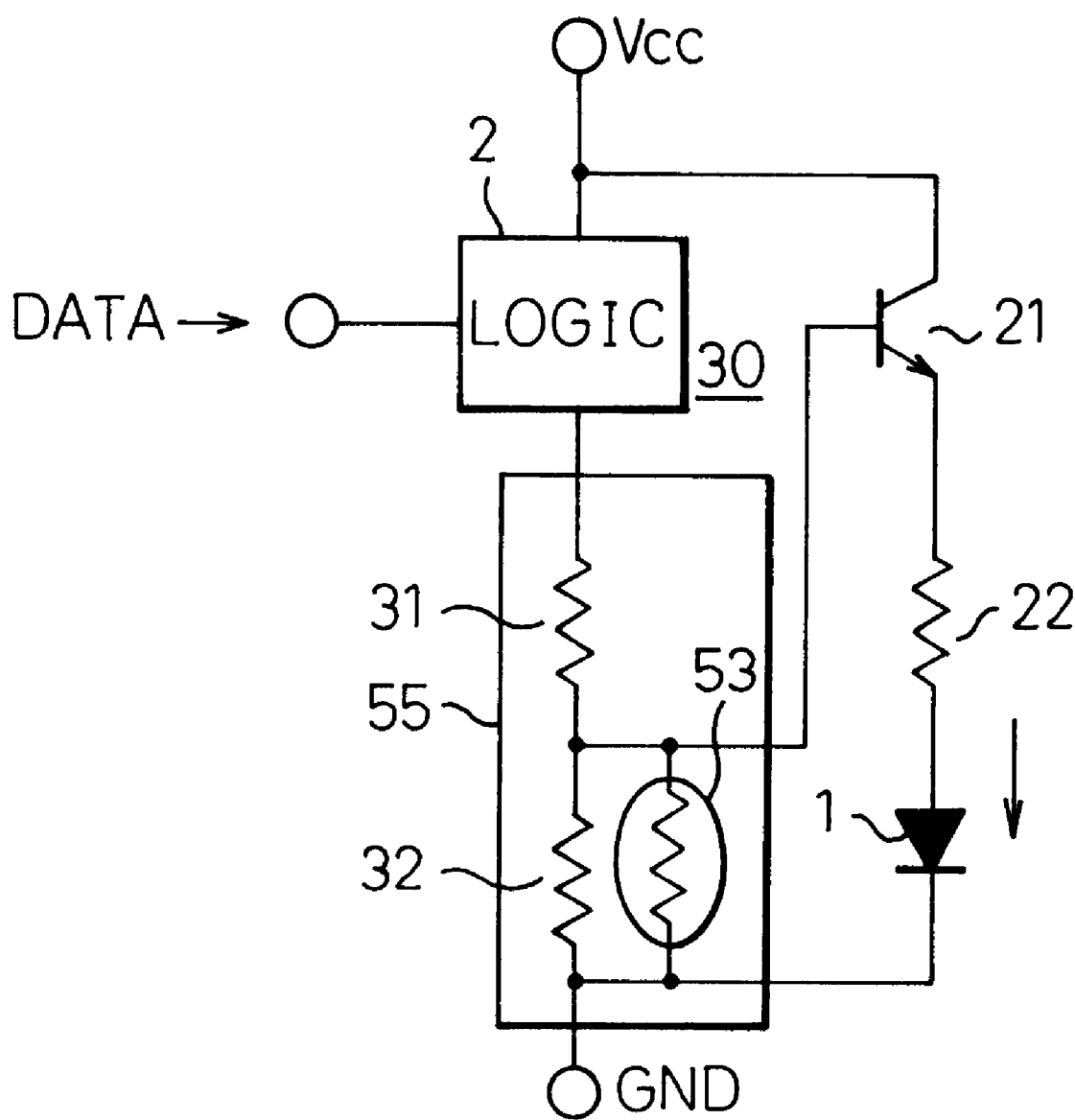
FIG. 10 is a view of a modification of the configuration of FIG. 9.

FIG. 10 is a view of a modification of the configuration of FIG. 9. In the figure, the temperature dependent resistive unit 55 is constituted by a first dividing resistor 31 and second dividing resistor 32 forming series-connected dividing resistors and a posistor (positive characteristic thermistor) 53 connected to this second dividing resistor 32 in parallel.

Figure 11:
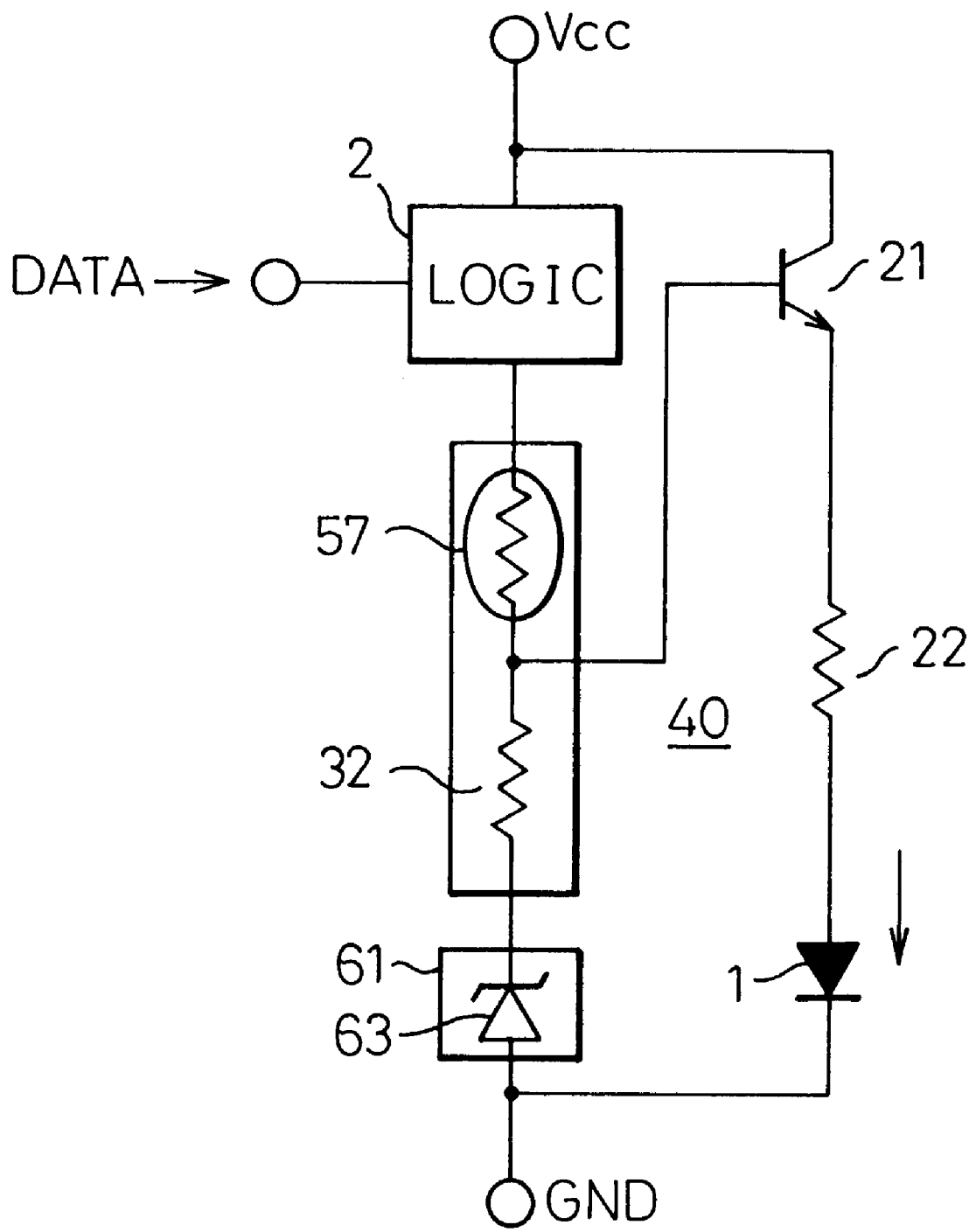
FIG. 11 is a view of a fifth embodiment of the present invention.

FIG. 11 is a view of a fifth embodiment of the present invention. In the figure, the boosting unit 61 shown in FIG. 4 is constituted by a Zener diode 63.

Figure 12:
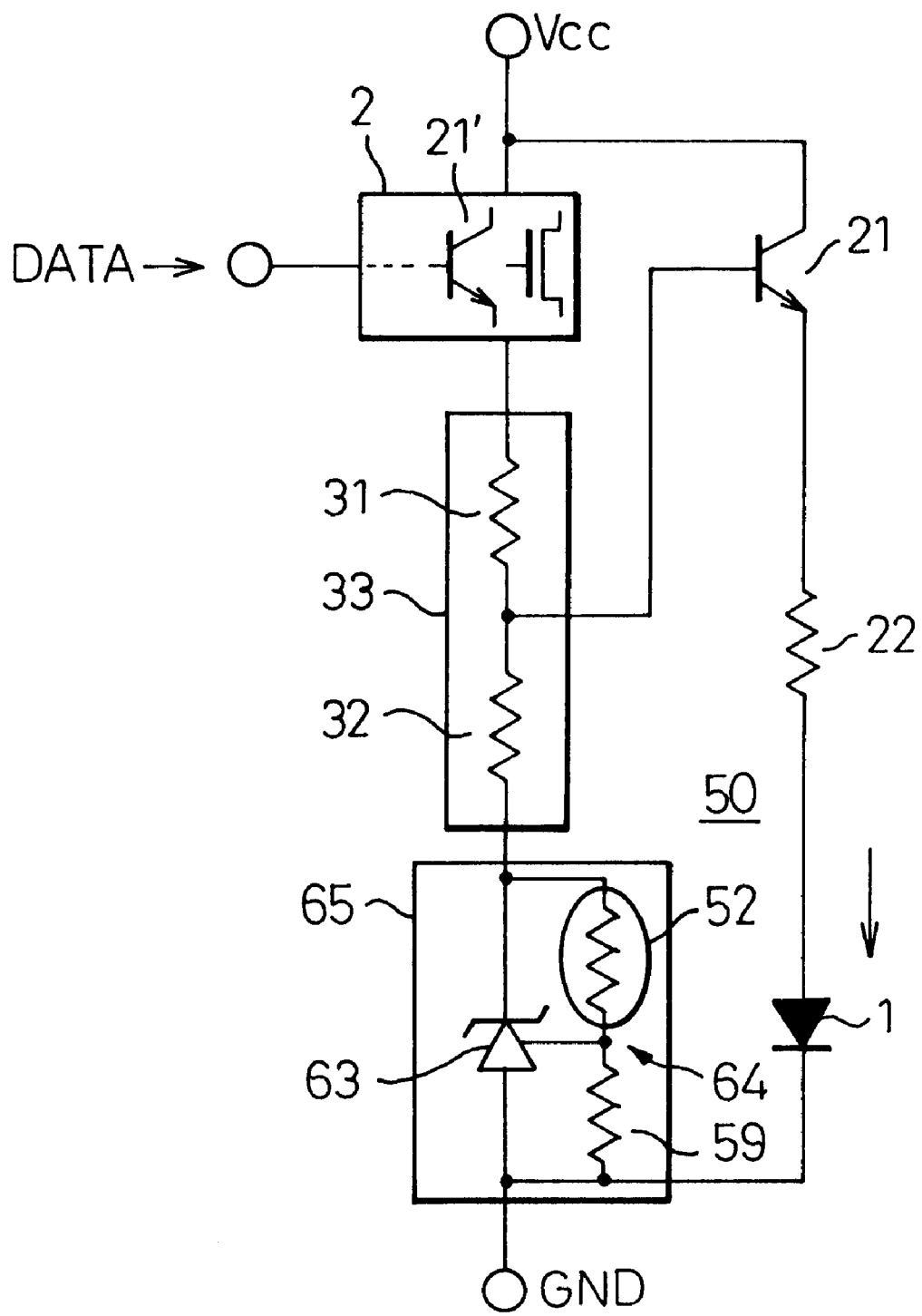
FIG. 12 is a view of a sixth embodiment of the present invention.

FIG. 12 is a view of a sixth embodiment of the present invention. In the figure, the temperature dependent boosting unit 65 shown in FIG. 5 comprises the Zener diode 63 provided with a resistive dividing circuit 64 for setting the Zener voltage, while the resistive dividing circuit 64 for setting this Zener voltage comprises a series-connected first dividing resistor and second dividing resistor 59. The first dividing resistor is constituted by the thermistor 52. The resistance value of the thermistor 52 changes according to a fluctuation in temperature, therefore the Zener voltage of the Zener diode 63 changes.

Figure 13:
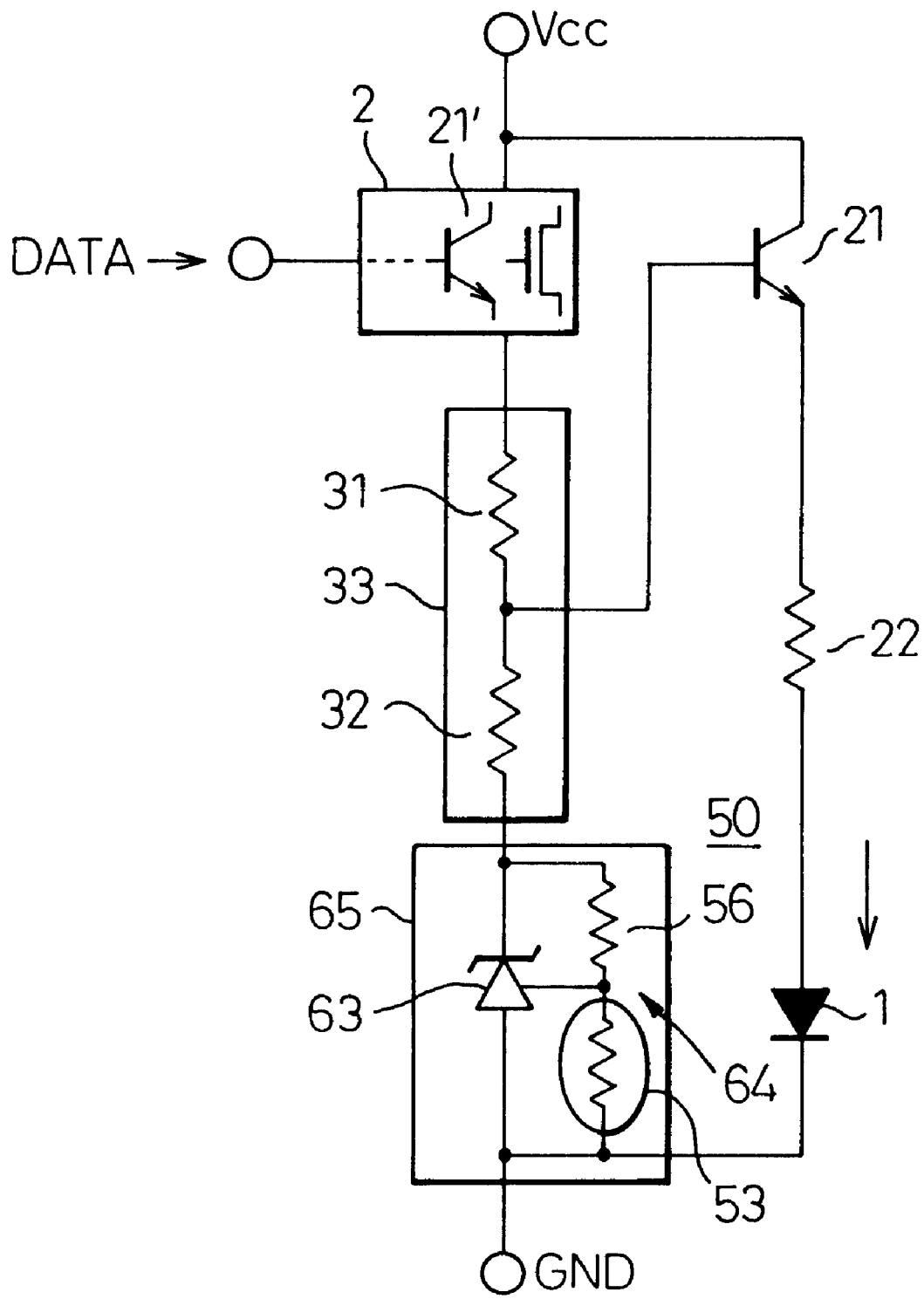
FIG. 13 is a view of a modification of the circuit of FIG. 12.

FIG. 13 is a view of a modification of the circuit of FIG. 12. In the figure, the temperature dependent boosting unit 65 comprises the Zener diode 63 provided with the resistive dividing circuit 64 for setting the Zener voltage. This resistive dividing circuit 64 for setting the Zener voltage comprises a series-connected first dividing resistor 56 and second dividing resistor, while the second dividing resistor is constituted by the posistor (positive characteristic thermistor) 53.

Figure 14:
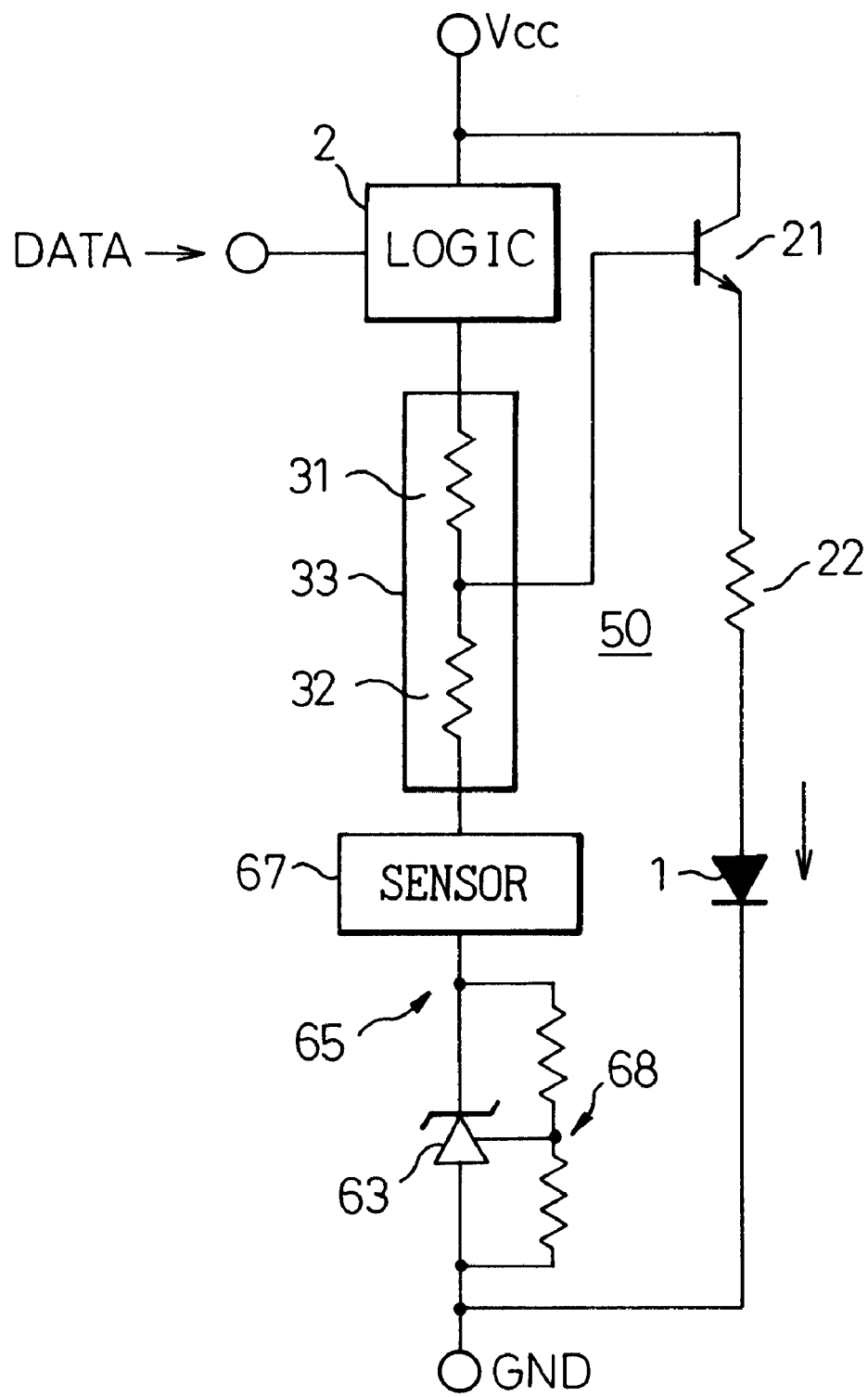
FIG. 14 is a view of a seventh embodiment of the present invention.

FIG. 14 is a view of a seventh embodiment of the present invention. In the figure, the temperature dependent boosting unit 65 comprises a temperature/voltage converting element 67. This temperature/voltage converting element 67 is a temperature sensor for outputting a voltage which increases along with a rise of temperature.

Figure 15:
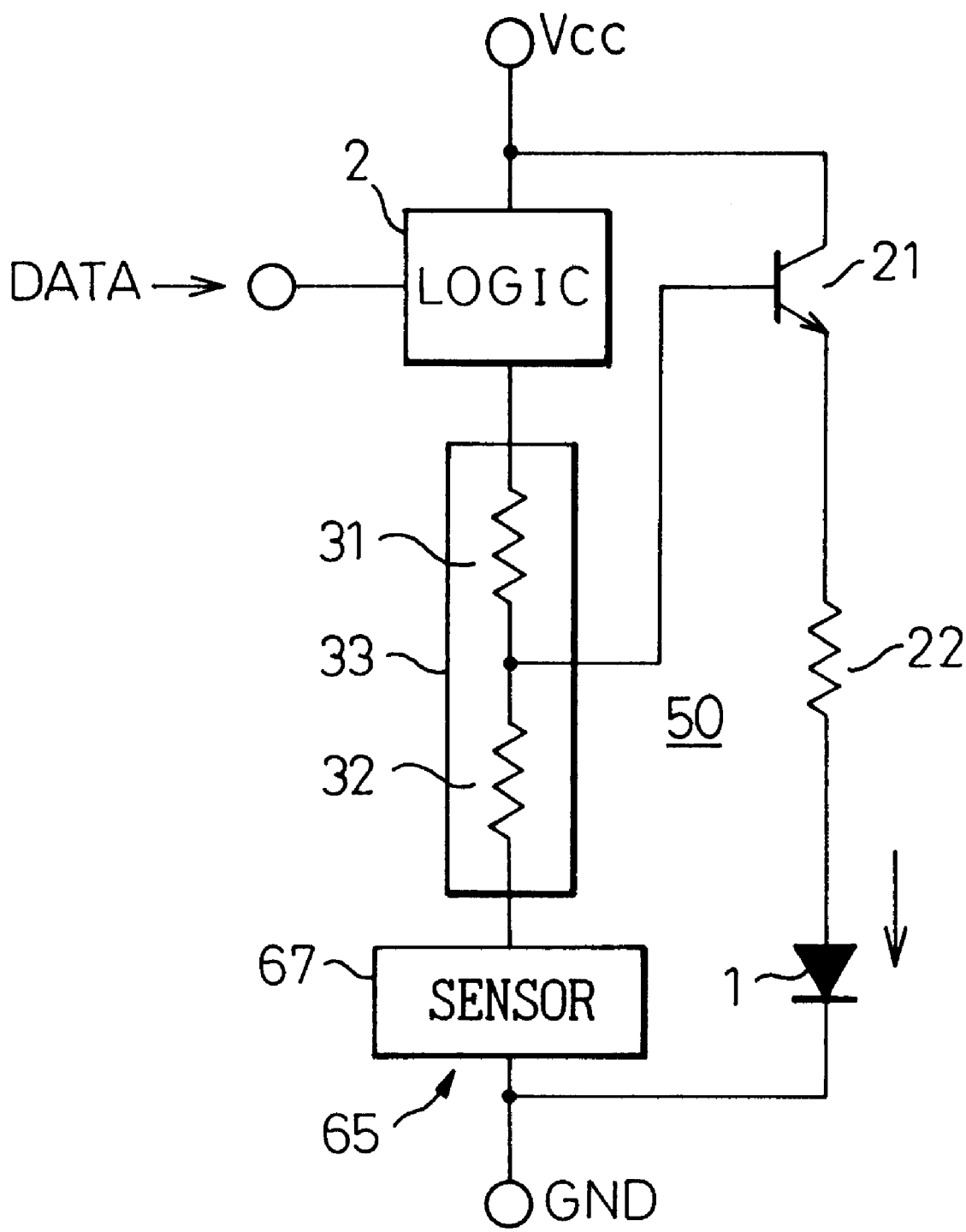
FIG. 15 is a view of an eighth embodiment of the present invention.

FIG. 15 is a view of an eighth embodiment of the present invention. In the figure, the temperature dependent boosting unit 65 is constituted by the Zener diode 63 provided with a resistive dividing circuit 68 for setting the Zener voltage and the temperature/voltage converting element 67 connected to this Zener diode in series. In this case, the Zener diode 63 can be made to act as a voltage source for providing an initial value (offset).

Finally, returning to FIG. 12, the source of the input pulse is the final output stage transistor of the logic circuit 2. This transistor is formed by a bipolar transistor or field effect transistor.

As explained above, the light emitting device driving circuit based on the present invention can drive a light emitting device directly from the logic circuit 2 or by only adding a simple circuit, therefore a reduction of costs can be achieved. Accordingly, this can be applied to the subscriber side system etc. for which a reduction of costs is required. Here, according to the present invention, it is possible to obtain a stable optical output not depending upon the temperature even in a case of driving a light emitting device having characteristics which change according to the temperature. For this reason, the range of selection of the light emitting device is broadened and it becomes possible to further broaden the range of application temperature.

While the invention has been described with reference to specific embodiments chosen for purposes of illustration, it should be apparent that numerous modifications could be made thereto by those skilled in the art without departing from the basic concept and scope of the invention.

What is claimed is:

1. A light emitting device driving circuit comprising:
    a driving transistor, connected between an anode side of a light emitting device having a grounded-cathode and a power source side feeding a bias current and a pulse current responding to an input pulse to the light emitting device; and
    an adjusting resistor coupled between the driving transistor and light emitting device, that adjusts the pulse current and the bias current fed to the light emitting device, said adjusting resistor constituted by a temperature dependent resistive unit.

2. A light emitting device driving circuit according to claim 1, wherein said temperature dependent resistive unit comprises a thermistor.

3. A light emitting device driving circuit according to claim 1, wherein said temperature dependent resistive unit is constituted by said adjusting resistor and a thermistor connected to the adjusting resistor in parallel.

4. A light emitting device driving circuit according to claim 1, wherein said driving transistor is a bipolar transistor or a field effect transistor.

5. A light emitting device driving circuit comprising:
    a driving transistor connected to an anode side of the light emitting device having a grounded-cathode, feeding both a bias current and a pulse current responding to an input pulse to the light emitting device;
    an adjusting resistor coupled between the driving transistor and light emitting device, that adjusts the pulse current and the bias current fed to the light emitting device; and
    a resistive dividing circuit having serially connected dividing resistors, individually setting the pulse current and the bias current fed to the light emitting device, one of said serially connected dividing resistors constituted by a temperature dependent resistive unit.

6. A light emitting device driving circuit according to claim 5, wherein said temperature dependent resistive unit comprises a series-connected first dividing resistor and second dividing resistor, and the first dividing resistor comprises a thermistor.

7. A light emitting device driving circuit according to claim 5, wherein said temperature dependent resistive unit comprises a series-connected first dividing resistor and second dividing resistor, and the second dividing resistor comprises a positive characteristic thermistor.

8. A light emitting device driving circuit according to claim 5, wherein said temperature dependent resistive unit is constituted by a first dividing resistor and second dividing resistor forming said series-connected dividing resistors and a thermistor connected to the first dividing resistor in parallel.

9. A light emitting device driving circuit according to claim 5, wherein said temperature dependent resistive unit is constituted by a first dividing resistor and second dividing resistor forming said series-connected dividing resistors and a positive characteristic thermistor connected to the second dividing resistor in parallel.

10. A light emitting device driving circuit according to claim 5, wherein the source of said input pulse is a final output stage transistor of a logic circuit and the transistor is a bipolar transistor or field effect transistor.

11. A light emitting device driving circuit according to claim 5, having a boosting unit for boosting the resistive dividing voltage from said resistive dividing circuit.

12. A light emitting device driving circuit according to claim 11, wherein said boosting unit comprises a constant voltage source.

13. A light emitting device driving circuit according to claim 11, wherein said boosting unit comprises a Zener diode.

14. A light emitting device driving circuit comprising:
a driving transistor connected to an anode side of the light emitting device having a grounded-cathode, feeding both a bias current and a pulse current responding to an input pulse to the light emitting device;
an adjusting resistor coupled between the driving transistor and light emitting device, that adjusts the pulse current and the bias current fed to the light emitting device;
a resistive dividing circuit having serially connected dividing resistors, individually setting the pulse current and the bias current fed to the light emitting device; and
a temperature dependent boosting unit boosting the resistive dividing voltage from said resistive dividing circuit depending upon a temperature.

15. A light emitting device driving circuit according to claim 14, wherein said temperature dependent boosting unit comprises a temperature dependent voltage source.

16. A light emitting device driving circuit according to claim 14, wherein said temperature dependent boosting unit comprises a Zener diode provided with a resistive dividing circuit for setting the Zener voltage; the resistive dividing circuit for setting the Zener voltage comprises a series-connected first dividing resistor and second dividing resistor, and the first dividing resistor comprises a thermistor.

17. A light emitting device driving circuit according to claim 14, wherein said temperature dependent boosting unit comprises a Zener diode provided with a resistive dividing circuit for setting the Zener voltage; the resistive dividing circuit for setting the Zener voltage comprises a series-connected first dividing resistor and second dividing resistor, and the second dividing resistor comprises a positive characteristic thermistor.

18. A light emitting device driving circuit according to claim 14, wherein said temperature dependent boosting unit comprises a temperature/voltage converting element.

19. A light emitting device driving circuit according to claim 14, wherein said temperature dependent boosting unit comprises a Zener diode provided with a resistive dividing circuit for setting the Zener voltage and the temperature/voltage converting element connected to the Zener diode in series.

20. A light emitting device driving circuit according to claim 14, wherein the source of said input pulse is the final output stage transistor of the logic circuit; and the transistor is a bipolar transistor or field effect transistor.

21. An apparatus comprising:
a light emitting device producing an optical output power in accordance with a driving current of the light emitting device, the light emitting device having a threshold current; and
an adjusting device coupled relative to the light emitting device and adjusting the driving current in accordance with the threshold current so that the optical output power produced by the light emitting device remains stable during fluctuations in temperature.

22. An apparatus as in claim 21, wherein the adjusting device is a temperature dependant resistive device.

23. An apparatus as in claim 21, wherein the adjusting device is a thermistor.

24. An apparatus comprising:
a light emitting device with power output properties which vary according to temperature; and
a temperature dependent resistance unit serially connected to the light emitting device and an input unit, wherein the temperature dependent resistance unit contains properties that adjust the driving current in accordance with the power output properties of the light emitting device so that an output power of the light emitting device remains stable.

25. An apparatus as in claim 24, wherein the adjusting device is a thermistor.

26. A light emitting device driving circuit comprising:
a driving transistor connected to an anode side of the light emitting device having a grounded-cathode, feeding both a bias current and a pulse current responding to an input pulse to the light emitting device;
an adjusting resistor coupled between the driving transistor and light emitting device, that adjusts the pulse current and the bias current fed to the light emitting device;
a resistive dividing circuit having serially connected dividing resistors, individually setting the pulse current and the bias current fed to the light emitting device; and
a temperature dependent boosting unit that boosts the resistive dividing voltage from said resistive dividing circuit depending upon a temperature, said temperature dependent boosting unit further comprising a Zener diode provided with a resistive dividing circuit for setting the Zener voltage; wherein the resistive dividing circuit for setting the Zener voltage comprises a series-connected first dividing resistor and second dividing resistor, and the first dividing resistor comprises a thermistor.

27. A light emitting device driving circuit comprising:
a driving transistor connected to an anode side of the light emitting device having a grounded-cathode, feeding both a bias current and a pulse current responding to an input pulse to the light emitting device;
an adjusting resistor coupled between the driving transistor and light emitting device, that adjusts the pulse current and the bias current fed to the light emitting device;
a resistive dividing circuit having serially connected dividing resistors, individually setting the pulse current and the bias current fed to the light emitting device; and
a temperature dependent boosting unit that boosts the resistive dividing voltage from said resistive dividing circuit depending upon a temperature, said temperature dependent boosting unit further comprising a Zener diode provided with a resistive dividing circuit for setting the Zener voltage; the resistive dividing circuit for setting the Zener voltage comprises a series-connected first dividing resistor and second dividing resistor, and the second dividing resistor comprises a positive characteristic thermistor.

28. A light emitting device driving circuit comprising:
a driving transistor connected to an anode side of the light emitting device having a grounded-cathode, feeding both a bias current and a pulse current responding to an input pulse to the light emitting device;
an adjusting resistor coupled between the driving transistor and light emitting device, that adjusts the pulse current and the bias current fed to the light emitting device;
a resistive dividing circuit having serially connected dividing resistors, individually setting the pulse current and the bias current fed to the light emitting device; and
a temperature dependent boosting unit that boosts the resistive dividing voltage from said resistive dividing circuit depending upon a temperature, said temperature dependent boosting unit further comprising a Zener diode provided with a resistive dividing circuit for setting the Zener voltage and the temperature/voltage converting element connected to the Zener diode in series.

* * * * *

UNITED STATES PATENT AND TRADEMARK OFFICE
CERTIFICATE OF CORRECTION

PATENT NO. : 6,242,870 B1 Page 1 of 1
DATED : June 5, 2001
INVENTOR(S) : Hisako Koyanagi et al.

It is certified that error appears in the above-identified patent and that said Letters Patent is hereby corrected as shown below:

Column 9,
Line 50, change "coupled relative" to -- serially connected --.

Signed and Sealed this

Twelfth Day of March, 2002

Attest:

JAMES E. ROGAN
Attesting Officer *Director of the United States Patent and Trademark Office*